US012601074B2

(12) United States Patent
Bouwman et al.

(10) Patent No.: US 12,601,074 B2
(45) Date of Patent: Apr. 14, 2026

(54) METHOD FOR GENERATING HYDROGEN AND OXYGEN FROM A LIQUID FEED STREAM COMPRISING WATER, AND DEVICE THEREFOR

(71) Applicant: VITO NV, Mol (BE)

(72) Inventors: Lambertus Bouwman, Mol (BE); Metin Bulut, Mol (BE)

(73) Assignee: VITO NV, Mol (BE)

( * ) Notice: Subject to any disclaimer, the term of this patent is extended or adjusted under 35 U.S.C. 154(b) by 907 days.

(21) Appl. No.: 17/788,096

(22) PCT Filed: Dec. 22, 2020

(86) PCT No.: PCT/EP2020/087689
§ 371 (c)(1),
(2) Date: Jun. 22, 2022

(87) PCT Pub. No.: WO2021/130261
PCT Pub. Date: Jul. 1, 2021

(65) Prior Publication Data
US 2023/0032928 A1 Feb. 2, 2023

(30) Foreign Application Priority Data
Dec. 26, 2019 (EP) .................................... 19219730

(51) Int. Cl.
*C25B 15/08* (2006.01)
*B01D 61/00* (2006.01)
(Continued)

(52) U.S. Cl.
CPC .......... *C25B 15/08* (2013.01); *B01D 61/0022* (2022.08); *C25B 1/04* (2013.01); *C25B 9/19* (2021.01)

(58) Field of Classification Search
None
See application file for complete search history.

(56) References Cited

U.S. PATENT DOCUMENTS 4,105,528 A * 8/1978 Hasebe ..................... C25B 9/15
204/278
4,490,232 A * 12/1984 Lapeyre ................... C25B 1/04
290/42
(Continued)

FOREIGN PATENT DOCUMENTS

CN 107881526 A 4/2018
JP 2013249508 A 12/2013
(Continued)

OTHER PUBLICATIONS

Alsvik et al, Pressure Retarded Osmosis and Forward Osmosis Membranes: Materials and Methods, Polymers, vol. 5, special issue Polymer Thin Films and Membranes 2013, Mar. 2013, pp. 303-327 (Year: 2013).*

(Continued)

*Primary Examiner* — Harry D Wilkins, III
(74) *Attorney, Agent, or Firm* — Kolitch Romano Dascenzo Gates LLP

(57) ABSTRACT

A method is disclosed for the generation of hydrogen and oxygen from a liquid feed stream comprising water. The method includes passing an electric current through an aqueous electrolyte solution. Water is fed to the aqueous electrolyte solution by forward osmosis, wherein the aqueous electrolyte solution is brought into contact with a first side of a forward osmosis membrane and the liquid feed stream comprising water is brought into contact with a second side of the forward osmosis membrane. Water permeates through the forward osmosis membrane from the second side to the first side by a difference in osmotic pressure between the liquid feed stream and the aqueous electrolyte solution. Further, a device is disclosed for carrying out the above method.

17 Claims, 2 Drawing Sheets

(51) Int. Cl.
    *C25B 1/04*           (2021.01)
    *C25B 9/19*           (2021.01)

(56)           References Cited

U.S. PATENT DOCUMENTS

| | | | | |
|---|---|---|---|---|
| 5,231,954 | A * | 8/1993 | Stowe | F02B 43/10 |
| | | | | 204/278 |
| 5,796,799 | A * | 8/1998 | Kobayashi | G21C 19/307 |
| | | | | 204/263 |
| 6,689,259 | B1 * | 2/2004 | Klein | C25B 1/04 |
| | | | | 204/278 |
| 10,886,548 | B2 * | 1/2021 | Milnes | C25B 9/19 |
| 2006/0254913 | A1 * | 11/2006 | Myers | F04B 19/006 |
| | | | | 204/600 |
| 2008/0047830 | A1 * | 2/2008 | Fairfull | C25B 11/00 |
| | | | | 204/286.1 |
| 2010/0065419 | A1 * | 3/2010 | Richardson | C25B 1/04 |
| | | | | 204/228.2 |
| 2011/0030365 | A1 * | 2/2011 | Gilboa | F03B 17/025 |
| | | | | 60/497 |
| 2016/0362799 | A1 * | 12/2016 | Ramos Agundo | H01M 10/46 |
| 2017/0077538 | A1 * | 3/2017 | Milnes | H01M 50/489 |
| 2017/0129796 | A1 | 5/2017 | Iyer | |
| 2019/0323132 | A1 * | 10/2019 | Kazadi | C25B 15/08 |
| 2020/0147553 | A1 * | 5/2020 | James | C02F 1/441 |
| 2023/0032928 | A1 * | 2/2023 | Bouwman | B01D 61/0022 |
| 2023/0191328 | A1 * | 6/2023 | Nocera | B01D 61/005 |
| | | | | 210/638 |
| 2023/0399245 | A1 * | 12/2023 | Abdel-Wahab | B01D 61/427 |
| 2024/0093396 | A1 * | 3/2024 | Markgraf | C25B 15/08 |

FOREIGN PATENT DOCUMENTS

| | | |
|---|---|---|
| JP | 5791377 B2 | 10/2015 |
| WO | 2002016289 A2 | 2/2002 |
| WO | 2017090431 A1 | 6/2017 |

OTHER PUBLICATIONS

Zou, Advancing Forward Osmosis for Energy-efficient Wastewater Treatment towards Enhanced Water Reuse and Resource Recovery, PhD Thesis, Virginia Tech, May 2019, pp. 1-185 (Year: 2019).*
International Search Report and Written Opinion of the International Searching Authority from the European Patent Office, in PCT/EP2020/087689 dated Apr. 8, 2021, which is an international application corresponding to this U.S. application.
Cath, Tzahi Y. et al. "Forward osmosis: Principles, applications, and recent developments"; obtained from the Journal of Membrane Science, vol. 281 (2006) p. 70-87.

* cited by examiner

METHOD FOR GENERATING HYDROGEN AND OXYGEN FROM A LIQUID FEED STREAM COMPRISING WATER, AND DEVICE THEREFOR

TECHNICAL FIELD

The present disclosure is related to a method for the generation of hydrogen and oxygen from a liquid feed stream comprising water, in particular a saline water stream. The present disclosure is further related to a device for the generation of hydrogen and oxygen from a liquid feed stream comprising water.

INTRODUCTION

Water electrolyzers are used for the generation of hydrogen and oxygen by passing an electric current through an electrolyte to convert water electrochemically into hydrogen (gas) and oxygen (gas). Although solid polymer electrolytes can be used in such water electrolysers, aqueous electrolyte solutions are most often employed.

Existing systems are for example high-pressure water electrolysers, wherein a feed stream comprising water is fed into the electrochemical cell, i.e. an electrolysis cell, under operating pressures between 1 bar and 200 bar. High-pressure systems allow to generate a compressed hydrogen output, and thus eliminate the need for an external compressor for the hydrogen gas.

Since water is consumed during generation of hydrogen and oxygen, water electrolysers require a feed of water to be added to the electrolyte, in particular to an aqueous electrolyte solution. With a growing world population, global expansion of business activity, rapid urbanization and climate change, there is an increasing demand on fresh water, with increasing water scarcity. Hence, it would accordingly be beneficial if the water comes no longer from fresh water feeds, but from other liquid feed streams comprising water, for example a saline stream, such as sea water and brackish water.

CN 107881526 describes a system for preparing hydrogen and oxygen by using tidal current energy and seawater. The seawater is desalinated by reverse osmosis (RO) to obtain purified water that is used in an electrolysis unit, where water is converted to hydrogen and oxygen. Reverse osmosis extensively removes dissolved salts by forcing water having a high content of dissolved salts at high pressures through dedicated semi-permeable membranes, which can be made of various polymer materials. The membranes are susceptible to fouling and other processes need to precede the RO process to prevent fouling and increase RO membrane lifetime. In CN 107881526, the purified water obtained by a RO process is directly used in the electrolysis cell, and no special electrolyte solutions are used, nor recirculated.

WO 02/16289 discloses a high-pressure electrolyzer for use on-board a marine vessel. Sea water is first purified (desalinated) using the purification installations available on-board, followed by electrolysis of the obtained fresh water into hydrogen gas.

US 2016/0362799 discloses an onshore installation wherein sea water is first purified into fresh water and the fresh water is then converted into hydrogen and oxygen by means of electrolysis.

US 2011/0030365 discloses a similar installation as US2016/0362799, further using the mechanical energy of the sea waves as energy source for the processes requiring electrical power.

One disadvantage of the above-mentioned installations is that the saline water has to be desalinated into a stream of fresh water before it can be fed to the electrolyzer for conversion into hydrogen and oxygen.

US 2019/0323132 discloses a method and a device for producing hydrogen gas and oxygen gas by means of electrolysis of water in an aqueous electrolyte solution. The aqueous electrolyte solution is replenished with fresh water obtained from a liquid feed stream, in particular saline water, by means of a vacuum mediated forward osmosis process. In the vacuum mediated forward osmosis process, water is first evaporated from the liquid feed stream, wherein the water vapor passes through a vapor transfer tunnel and condensates into the aqueous electrolyte solution. One disadvantage of this system is that energy is required for the evaporation of the water from the saline feed stream to the aqueous electrolyte solution.

On the other hand, US 2017/0129796 describes a system for production of pure water by desalination of seawater that includes a forward osmosis (FO) reactor and an electrode-ionization (EDI) reactor. An aqueous electrolyte solution flows between the FO reactor and the EDI reactor. In the FO reactor, the aqueous electrolyte solution draws water through the FO membrane. In the EDI reactor, the water is split into hydrogen and hydroxyl ions by the use of cation and anion exchange membranes along with strong ion-exchange resins enabling the EDI reactor to function electrochemically to transfer protons and hydroxyl ions across the membranes for recombination into pure water, leaving only a concentrated polymeric solution in the reactor for recycling to the FO reactor. An impressed voltage of 0.8 VDC is used, preventing electrolysis of water which would produce oxygen and hydrogen gases. In the system of US 2017/0129796, water is hence not electrolyzed, but only ionic splitting and transport of hydrogen cations and hydroxyl anions take place across the relevant membranes, after which they recombine into pure water.

Osmotic driving forces in FO can be significantly greater than hydraulic driving forces in RO, leading to higher water flux rates and recoveries. One further advantage of FO systems is that they are non-pressurized systems, allowing design with lighter, compact, and less expensive materials. Another advantage is that operation of FO systems requires less energy. These factors translate to savings both in capital and operational costs. In addition, the lower amount of more highly concentrated reject brine produced by FO processes can also more easily managed.

SUMMARY

The present disclosure aims to solve one or more of the problems of the devices and methods of the state of the art. It is an aim of the present disclosure to provide an improved method and related device for the generation of hydrogen and oxygen from a liquid feed stream comprising water, which, amongst other advantages, involves a reduced number of processing steps, is more efficient and reduces the energy consumption.

The present disclosure further aims to provide an improved device for the generation of hydrogen and oxygen from a liquid feed stream comprising water, which, amongst other advantages, is of simpler construction.

According to a first aspect of the present disclosure, there is therefore provided a method for the generation of hydrogen and oxygen from a liquid feed stream comprising water. The method comprises passing an electric current through an aqueous electrolyte solution. Hydrogen (gas) and oxygen (gas) are thereby generated. Advantageously, the hydrogen and/or the oxygen are separated or extracted from the electrolyte solution. Water is fed to the aqueous electrolyte solution by means of forward osmosis. The aqueous electrolyte solution is brought into contact with a first side of a forward osmosis membrane and the liquid feed stream comprising water is brought into contact with a second side of the forward osmosis membrane. Water permeates through the forward osmosis membrane from the second side to the first side by means of a difference in osmotic pressure between the liquid feed stream and the aqueous electrolyte solution.

Advantageously, the aqueous electrolyte solution has an osmolarity of at least 1700 mOsm/L. Advantageously, the liquid feed stream has an osmolarity of 1250 mOsm/L or less. Advantageously, the difference in osmotic pressure between the liquid feed stream and the aqueous electrolyte solution is at least 20 bar.

Advantageously, the aqueous electrolyte solution comprises an alkaline electrolyte. Advantageously, the aqueous electrolyte solution is an aqueous alkaline electrolyte solution. Advantageously, the alkaline electrolyte comprises KOH and/or NaOH.

Advantageously, the liquid feed stream is a saline water stream.

Advantageously, the electric current passes through the aqueous electrolyte solution in an electrochemical cell comprising an anode and a cathode. Water in the aqueous solution is advantageously consumed in the electrochemical cell.

According to a second aspect of the present disclosure, there is provided a device for the generation of hydrogen and oxygen from a liquid feed stream comprising water. Devices according to the present aspect are advantageously configured to carry out methods for generation of hydrogen and oxygen as described herein. The device advantageously comprises an electrochemical cell and an osmosis unit. The electrochemical cell advantageously comprising an anode, a cathode and an electrolyte compartment for containing an aqueous electrolyte solution. The electrochemical cell is advantageously configured for passing an electric current through the electrolyte compartment. By so doing, hydrogen (gas) and oxygen (gas) are generated. The osmosis unit advantageously comprises a forward osmosis membrane, a first compartment fluidly connected to the electrolyte compartment, and a second compartment comprising a feed inlet and a feed outlet. The first compartment is advantageously in contact with a first side of the forward osmosis membrane for passing the aqueous electrolyte solution along the first side of the forward osmosis membrane. The second compartment is advantageously in contact with a second side of the forward osmosis membrane for passing a liquid feed stream along the second side of the forward osmosis membrane. Preferably, the electrolyte compartment is in fluid contact with the anode and/or the cathode.

The device according to the present disclosure may comprise a first electrolyte compartment for feeding a first electrolyte solution to the anode and a second electrolyte compartment for feeding a second electrolyte solution to the cathode. The first compartment of the osmosis unit is advantageously fluidly connected to one or both of the first and second electrolyte compartments.

The device comprises means for separating hydrogen and/or oxygen. The means for separating hydrogen and/or oxygen can be part of the electrolyte compartment and be fluidly connected with the osmosis unit, or can comprise a unit fluidly connected between the electrolyte compartment and the first compartment of the osmosis unit. The means for separating hydrogen and/or oxygen can be an extraction system comprising one or more extraction outlets for evacuating respectively hydrogen gas and/or oxygen gas from the electrolyte compartment.

Advantageously, the forward osmosis membrane of the device of the present disclosure is a semi-permeable membrane. Preferably, the forward osmosis membrane is a non-porous, water selectively permeable membrane. Preferably, the forward osmosis membrane material is selected from the group consisting of asymmetric aromatic polyamide, cellulose acetate optionally reinforced with mineral fillers, and cellulose triacetate.

Advantageously, the first side of the forward osmosis membrane of the device of the present disclosure forms a wall of the first compartment of the osmosis unit. Advantageously, the second side of the forward osmosis membrane of the device of the present disclosure forms a wall of the second compartment of the osmosis unit.

BRIEF DESCRIPTION OF THE DRAWINGS

Aspects of the present disclosure will now be described in more detail with reference to the appended drawings, wherein same reference numerals illustrate same features and wherein.

DETAILED DESCRIPTION

Figure 1:
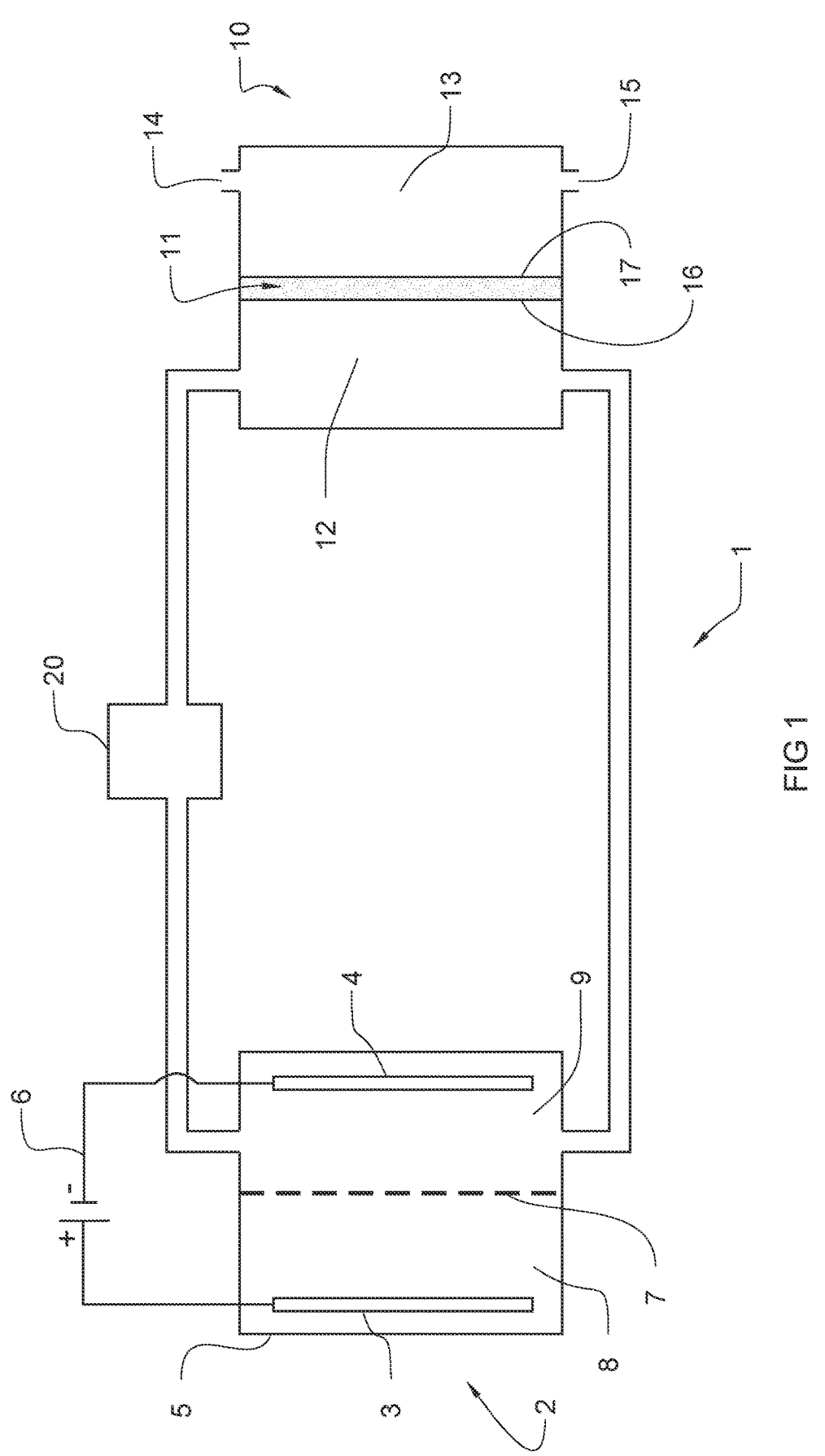
FIG. 1 represents schematically a device according to a first embodiment of the present disclosure.

Methods for the generation of hydrogen and oxygen from an aqueous liquid feed stream comprise an electrolysis step in which an electric current is passed through an aqueous electrolyte solution. The aqueous electrolyte solution is depleted from water contained therein as the water converts to hydrogen and oxygen, and a concentrated electrolyte solution is obtained. The concentrated electrolyte solution is replenished (diluted) with water in a forward osmosis step. According to an aspect of the present disclosure, the concentrated electrolyte solution acts as the draw solution in the forward osmosis step, allowing water to be drawn from a feed stream. The concentrated electrolyte solution is hence advantageously brought into contact with a first side of a forward osmosis membrane. A liquid feed stream comprising water is advantageously brought into contact with a second side of the forward osmosis membrane, opposite to the first side. Water advantageously permeates through the forward osmosis membrane from the second side to the first side due to a difference in osmotic pressure between the liquid feed stream and the concentrated electrolyte solution.

According to the present disclosure, in the electrolysis step, hydrogen (gas) and oxygen (gas) are generated by passing an electric current through an aqueous electrolyte solution. By so doing, electrolysis of water contained in the aqueous electrolyte solution is obtained. As the electrolysis process depletes water in the aqueous electrolyte solution, fresh water must be fed into the electrolyte solution stream. The inventors now have surprisingly found that water can advantageously be fed to the aqueous electrolyte solution from a liquid feed stream comprising water by means of forward osmosis. Hence, the electrolyte salt can be used in an endless loop between the forward osmosis process to act as a so-called draw solution having a higher concentration of the electrolyte salt, and the electrolysis process where it acts as the electrolyte in an aqueous electrolyte solution having a lower concentration of the electrolyte salt, for converting the water into hydrogen and oxygen.

Water is fed from the liquid feed stream through the forward osmosis membrane to the aqueous electrolyte solution by means of a difference in osmotic pressure between the liquid feed stream and the aqueous electrolyte solution. In order for the water to be fed from the liquid feed stream to the aqueous electrolyte solution, the osmotic pressure of the aqueous electrolyte solution is larger than the osmotic pressure of the liquid feed stream. The osmotic pressure difference depends on the osmotic concentration or osmolarity of both liquid streams. In other words, the osmolarity of the aqueous electrolyte solution is larger than the osmolarity of the liquid feed stream in order to allow water to transfer from the liquid feed stream to the aqueous electrolyte solution through forward osmosis.

The aqueous electrolyte solution advantageously has an osmotic concentration or osmolarity of at least 1500 mOsm/L, advantageously at least 1700 mOsm/L, advantageously at least 1750 mOsm/L, advantageously at least 2000 mOsm/L, advantageously at least 2250 mOsm/L, advantageously at least 2500 mOsm/L. Advantageously, the osmolarity of the aqueous electrolyte solution is smaller than or equal to 75 Osm/L, advantageously smaller than or equal to 50 Osm/L, advantageously smaller than or equal to 30 Osm/L, advantageously smaller than or equal to 25 Osm/L, advantageously smaller than or equal to 20 Osm/L. The osmolarity of the aqueous electrolyte solution is advantageously determined for the (concentrated) solution that is fed to the osmosis unit for replenishment with water.

The aqueous electrolyte solution advantageously has an osmotic pressure of at least 40 bar, such as at least 50 bar, 75 bar, 100 bar, 125 bar, 150 bar, 175 bar, 200 bar, 250 bar, 300 bar, 350 bar, 400 bar, 450 bar, up to at least 500 bar. Preferably, the osmotic pressure is between 125 and 350 bar, even more preferably between 140 bar and 300 bar.

The liquid feed stream comprising water advantageously has an osmotic concentration or osmolarity of 2000 mOsm/L or less, such as 1750 mOsm/L or less, 1500 mOsm/L or less, or 1250 mOsm/L or less. Preferably the osmolarity of the liquid feed stream comprising water is about 1000 mOsm/L. The osmolarity of the liquid feed stream is advantageously at least 5 mOsm/L, advantageously at least 10 mOsm/L, advantageously at least 20 mOsm/L. The osmolarity of the liquid feed stream is advantageously determined at entrance into the osmosis unit.

The liquid feed stream comprising water advantageously has an osmotic pressure between 10 and 50 bar, such as between 15 and 45 bar, between 20 and 40 bar, and preferably between 25 and 35 bar. For example, a saline water feed stream at 25° C. has an osmotic pressure of about 28 bar.

The difference in osmotic pressure between the liquid feed stream and the aqueous electrolyte solution is advantageously at least 20 bar, advantageously between 20 and 500 bar, such as between 30 and 475 bar, between 50 and 450 bar, between 75 and 400 bar, or between 100 and 300 bar. Preferably, the difference in osmotic pressure is between 120 and 275 bar.

Above values of osmolarity and osmotic pressure are determined at 25° C. and atmospheric pressure.

The aqueous electrolyte solution advantageously comprises an alkaline electrolyte, advantageously is an alkaline electrolyte solution. Preferably, the alkaline electrolyte comprises KOH, NaOH, or a mixture of both.

The aqueous electrolyte solution advantageously has a molar concentration between 0.5 M and 15 M, preferably between 0.75 M and 10 M, such as between 1 M an 8 M, or between 2 M and 7 M, for example 5 M.

Preferably, the aqueous electrolyte solution is a KOH solution in a molar concentration range between 1 M and 8 M.

The liquid feed stream may be any type of waste stream comprising water. Preferably, the liquid feed stream is a saline water stream, such as seawater or brackish water.

The ionic concentration of the liquid feed stream is advantageously between 0.25 M and 5 M, such as between 0.5 M and 4 M, between 0.75 M and 3 M, or between 1 M and 1.5 M.

Preferably, the liquid feed stream is a saline water stream with an ionic concentration between 1 M and 1.5 M, such as seawater with an ionic concentration between 1 M and 1.5 M.

Advantageously, the electrolysis step as described above is performed in an electrochemical cell, advantageously an electrolysis cell. The electrochemical cell advantageously comprises an anode, a cathode and one or more electrolyte compartments arranged in an electric current path between the anode and the cathode. At least one of the one or more electrolyte compartments are configured for containing the aqueous electrolyte solution. The anode and cathode allow for passing the electric current through the aqueous electrolyte solution.

When the electric current passes through the aqueous electrolyte solution, water is advantageously consumed in the electrochemical cell. Preferably, water is consumed at the anode side, where it is converted into hydrogen (gas) and hydroxide ions according to formula (I). At the cathode side, the hydroxide ions are converted into oxygen (gas) and water according to formula (II). The net reaction clearly shows the consumption of 2 water molecules for the production of 1 oxygen molecule and 2 hydrogen molecules (formula (III)).

$$4H_2O + 4e^- \rightarrow 2H_2(g) + 4OH^- \tag{I}$$

$$4OH^- \rightarrow O_2(g) + 2H_2O + 4e^- \tag{II}$$

$$2H_2O \rightarrow 2H_2(g) + O_2(g) \tag{III}$$

The present disclosure further relates to a device for the generation of hydrogen and oxygen from a liquid feed stream comprising water. Referring to FIG. 1, the device 1 comprises an electrochemical cell 2 comprising an anode 3, a cathode 4 and an electrolyte compartment 5 for containing an aqueous electrolyte solution. Preferably, the electrochemical cell is an electrolysis cell. The electrochemical cell 2 is configured for passing an electric current 6 through the electrolyte compartment 5. The electrolyte compartment 5 is advantageously in fluid contact with the anode 3 and/or the cathode 4.

Preferably, the electrochemical cell comprises a separator membrane 7. The separator membrane 7 divides the electrolyte compartment 5 in an anode electrolyte compartment 8 and a cathode electrolyte compartment 9. The separator membrane may be an open mesh polyphenylene sulphide fabric symmetrically coated with a mixture of a polymer and zirconium oxide (Zirfon), or a generally known ion exchange membrane, such as an alkaline ion exchange membrane (alkaline AEM), an asbestos membrane, a NiO conductor membrane, or a ceramic OH⁻ conductor membrane.

The device 1 further comprises an osmosis unit 10 comprising a forward osmosis membrane 11, a first compartment (permeate side) 12 fluidly connected to the electrolyte compartment 5, and a second compartment 13 (feed side) comprising a feed inlet 14 and a feed outlet 15. The forward osmosis membrane 11 forms the separating wall between the first compartment 12 and the second compartment 13. A first side 16 of the forward osmosis membrane 11 is in contact with the first compartment 12 containing the concentrated electrolyte solution drawn from the electrochemical cell 2. A second side 17 of the forward osmosis membrane 11 is in contact with the second compartment 13 containing the liquid feed stream.

The concentrated electrolyte solution and the liquid feed stream can be made to flow along the membrane 11 as appropriate. Osmosis units with counter current flow, concurrent flow, cross flow or any suitable combination thereof can be contemplated.

Device 1 further comprises a unit 20 for separating hydrogen and/or oxygen from the electrolyte solution. The unit 20 is advantageously fluidly connected between the electrolyte compartment 5 and the first compartment 12 of the osmosis unit 10.

Figure 2:
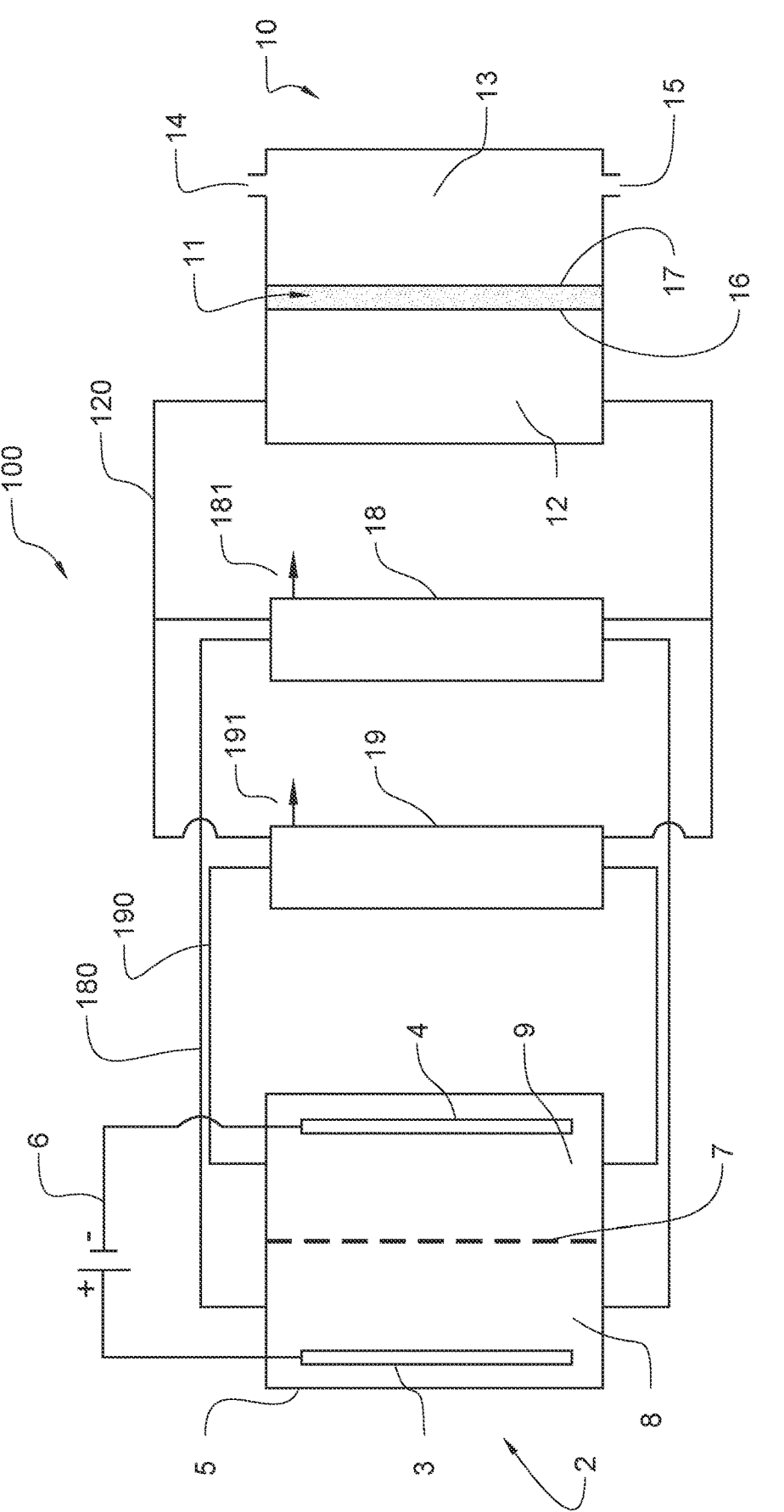
FIG. 2 represents schematically a device according to a second embodiment the present disclosure.

Referring to FIG. 2, a second embodiment of the device of the present disclosure is presented. The device 100 differs from the device 1 of FIG. 1 in that the anode electrolyte compartment 8 and the cathode electrolyte compartment 9 are fed with separate electrolyte solution streams. A first electrolyte compartment 18 is fluidly connected to the anode electrolyte compartment 8 of electrochemical cell 2 for feeding a first electrolyte solution to the anode 3. A second electrolyte compartment 19 is fluidly connected to the cathode electrolyte compartment 9 for feeding a second electrolyte solution to the cathode 4. The separator membrane 7 can divide the anode electrolyte compartment 8 from the cathode electrolyte compartment 9. The first electrolyte solution flows in a loop 180 as a diluted solution from the first electrolyte compartment 18 to the anode electrolyte compartment 8 and as a concentrated solution from the anode electrolyte compartment back to the first electrolyte compartment 18. Likewise, the second electrolyte solution flows in a loop 190 as a diluted solution from the second electrolyte compartment 19 to the cathode electrolyte compartment and as a concentrated solution back to the second electrolyte compartment.

In the first and second electrolyte compartments 18 and 19, the concentrated electrolyte solutions are diluted with fresh water produced by the osmosis unit 10. Advantageously, part of the concentrated electrolyte solution from the first and/or second electrolyte compartments can be drawn to the permeate compartment 12 of the osmosis unit and provide the driving force to extract water from the liquid feed solution of feed compartment 13, i.e. through a difference in osmotic pressure. It will be convenient to note that the first and second electrolyte solutions can have substantial identical composition. By way of example, concentrated first and second electrolyte solutions can be drawn from the first and second electrolyte compartments 18 and 19 respectively, and fed via a loop 120 to the permeate compartment 12. The concentrated first and second electrolyte solutions can be mixed in loop 120 and/or in the permeate compartment 12.

The first electrolyte compartment 18 can act as a separator for extracting hydrogen gas produced at the anode 3 from the first electrolyte solution. The hydrogen gas can be evacuated from the first electrolyte compartment 18 at extraction outlet 181. The second electrolyte compartment 19 can act as a separator for extracting oxygen gas produced at the cathode 4 from the second electrolyte solution. The oxygen gas can be evacuated from the second electrolyte compartment 19 at extraction outlet 191.

The osmosis unit 10 of device 100 can be made substantially identical to the osmosis unit of device 1 of FIG. 1. Preferably, the first compartment 12 of the osmosis unit 10 is delimited by the first side 16 of the forward osmosis membrane 11 and the second compartment 13 of the osmosis unit 10 is delimited by the second side 17 of the forward osmosis membrane 11.

According to an alternative embodiment (not shown), the device 100 of FIG. 2 is altered to comprise two osmosis units instead of one. Each osmosis unit can be fluidly connected to a respective one of the first and second electrolyte compartments 18 and 19. The second compartments 13 of the osmosis units can be fluidly connected in parallel or in series.

It is also possible to form separate loops between, on the one hand the anode electrolyte compartment 8, the first compartment 18 and the first (permeate) compartment of the osmosis unit 10, and on the other hand the cathode electrolyte compartment 9, the second compartment 19 and the first (permeate) compartment of the osmosis unit 10. Alternatively, each of the separate loops may be connected to a separate osmosis unit as outlined above.

The device of the present disclosure may comprise additional electrochemical cells, i.e. a stack of electrochemical cells. Preferably, each electrochemical cell comprises a separator membrane dividing the electrolyte compartment into an anode electrolyte compartment and a cathode electrolyte compartment.

All electrochemical cells of the stack are preferably fluidly connected to the osmosis unit as indicated above. The stack can comprise appropriate flow distribution manifolds for the anode electrolyte compartments and for the cathode electrolyte compartments which are fluidly connected to unit 20 or to the first and second electrolyte compartments 18 and 19 respectively. The anode electrolyte compartments of the stack, the cathode electrolyte compartments, or both may be fluidly connected in series. Alternatively, they may be fluidly connected in parallel.

The forward osmosis membrane 11 is advantageously a semi-permeable, porous membrane which is selective towards water molecules. When the liquid feed stream is a saline water stream, such as seawater or brackish water, the forward osmosis membrane is advantageously impermeable to salt, e.g. with a rejection higher than 90%.

Preferably, the forward osmosis membrane 11 has a high density of an active layer for a high rejection of the solute, such as salt when the liquid feed stream is a saline water stream. The osmosis membrane may further comprise a thin support layer with minimum porosity to allow a high flux of water.

Preferably, the forward osmosis membrane is hydrophilic. A hydrophilic osmosis membrane contributes to the flux of water, i.e. the quantity of water being fed from the liquid feed stream to the aqueous electrolyte solution per unit of time. A hydrophilic membrane also contributes to a reduction of fouling of the membrane at the second side.

The forward osmosis membrane comprises advantageously an active layer substantially made of asymmetric aromatic polyamide, cellulose acetate optionally reinforced with mineral fillers, and cellulose triacetate. These membranes can be synthesized through phase inversion. An extensive review on the characteristics of forward osmosis membranes and their current application is provided in T. Y. Cath et al., J. Membrane Science, Vol. 281 (2006) p. 70-87.

The forward osmosis membrane may be used as a flat sheet or as a hollow fiber.

The invention claimed is:

1. A method for the generation of hydrogen and oxygen from a liquid feed stream comprising water, the method comprising:

feeding an aqueous electrolyte solution to an electrolyte compartment of an electrochemical cell further comprising an anode and a cathode, wherein the electrolyte compartment is in fluid contact with both the anode and the cathode, passing an electric current through the aqueous electrolyte solution in the electrolyte compartment to generate hydrogen and oxygen from water in the aqueous electrolyte solution and to obtain a concentrated electrolyte solution, feeding the concentrated electrolyte solution from the electrolyte compartment to a first side of a forward osmosis membrane, wherein the concentrated electrolyte solution is brought into contact with the first side of the forward osmosis membrane, and bringing the liquid feed stream comprising water into contact with a second side of the forward osmosis membrane, wherein water permeates through the forward osmosis membrane from the second side to the first side due to a difference in osmotic pressure between the liquid feed stream and the concentrated electrolyte solution and regenerates the aqueous electrolyte solution.

2. The method according to claim 1, wherein the concentrated electrolyte solution has an osmolarity of at least 1700 mOsm/L.

3. The method according to claim 1, wherein the liquid feed stream has an osmolarity of 1250 mOsm/L or less.

4. The method according to claim 1, wherein the difference in osmotic pressure between the liquid feed stream and the concentrated electrolyte solution is at least 20 bar.

5. The method according to claim 1, wherein the aqueous electrolyte solution comprises an alkaline electrolyte.

6. The method according to claim 5, wherein the aqueous electrolyte solution comprises one or both of KOH and NaOH.

7. The method according to claim 1, wherein the liquid feed stream is a saline water stream.

8. The method according to claim 1, wherein the water in the aqueous electrolyte solution is consumed in the electrolyte compartment of the electrochemical cell.

9. A device for the generation of hydrogen and oxygen from a liquid feed stream comprising water, the device comprising:

an electrochemical cell comprising an anode, a cathode, and an electrolyte compartment configured to contain an aqueous electrolyte solution, wherein the electrolyte compartment is in fluid contact with both the anode and the cathode, and wherein the electrochemical cell is configured to pass an electric current through the electrolyte compartment to generate hydrogen and oxygen from water in the aqueous electrolyte solution and to obtain a concentrated electrolyte solution; and an osmosis unit comprising a forward osmosis membrane, a first compartment fluidly connected to the electrolyte compartment in an endless loop, and a second compartment comprising a feed inlet and a feed outlet;

wherein the first compartment is in contact with a first side of the forward osmosis membrane and configured to pass the concentrated electrolyte solution at the first side of the forward osmosis membrane, wherein the second compartment is in contact with a second side of the forward osmosis membrane and configured to pass a liquid feed stream at the second side of the forward osmosis membrane; and wherein the forward osmosis membrane is configured to permeate water therethrough from the second side to the first side due to a difference in osmotic pressure between the liquid feed stream and the concentrated electrolyte solution to regenerate the aqueous electrolyte solution.

10. The device according to claim 9, further comprising a separator configured to separate one or both of hydrogen and oxygen from the concentrated electrolyte solution.

11. The device of claim 10, wherein the separator comprises one or both of an extraction outlet for hydrogen and an extraction outlet for oxygen.

12. The device according to claim 9, further comprising a unit configured to separate one or both of hydrogen and oxygen from the concentrated electrolyte solution, wherein the unit for separating one or both of hydrogen and oxygen is fluidly connected between the electrolyte compartment and the first compartment of the osmosis unit.

13. The device according to claim 9, wherein the forward osmosis membrane is a semi-permeable membrane.

14. The device of claim 13, wherein the forward osmosis membrane is a non-porous, water selective permeable membrane.

15. The device according to claim 9, wherein the forward osmosis membrane is made of a material selected from the group consisting of asymmetric aromatic polyamide, cellulose acetate, and cellulose triacetate.

16. The device according to claim 9, wherein the first side of the forward osmosis membrane forms a wall of the first compartment of the osmosis unit and the second side of the forward osmosis membrane forms a wall of the second compartment of the osmosis unit.

17. A method for the generation of hydrogen and oxygen from a liquid feed stream comprising water, the method comprising:

feeding an aqueous electrolyte solution to an electrolyte compartment of an electrochemical cell further comprising an anode and a cathode, wherein the electrolyte compartment is in fluid contact with both the anode and the cathode, passing an electric current through the aqueous electrolyte solution in the electrolyte compartment to generate hydrogen and oxygen from water in the aqueous electrolyte solution and to obtain a concentrated electrolyte solution, separating hydrogen and oxygen from the concentrated electrolyte solution; and feeding the concentrated electrolyte solution from the electrolyte compartment to a first side of a forward osmosis membrane, wherein the concentrated electrolyte solution is brought into contact with the first side of the forward osmosis membrane, and bringing the liquid feed stream comprising water into contact with a second side of the forward osmosis membrane, wherein water permeates through the forward osmosis membrane from the second side to the first side due to a difference in osmotic pressure between the liquid feed stream and the concentrated electrolyte solution and, regenerates the aqueous electrolyte solution.

* * * * *